United States Patent [19]

Hikawa

[11] Patent Number: 5,054,359
[45] Date of Patent: Oct. 8, 1991

[54] MIDI SIGNAL PROCESSOR

[75] Inventor: Kazuo Hikawa, Yokohama, Japan

[73] Assignee: Victor Company of Japan, Ltd., Yokohama, Japan

[21] Appl. No.: 440,043

[22] Filed: Nov. 21, 1989

[30] Foreign Application Priority Data

Nov. 21, 1988 [JP] Japan .................... 63-294407

[51] Int. Cl.$^5$ .................... G10H 7/00; G11B 27/10
[52] U.S. Cl. .................... 84/645; 84/621; 369/33
[58] Field of Search .................... 84/600–602, 84/605, 609, 621, 639, 645, 649; 369/59, 33; 811/600–602, 605, 609, 621, 639, 645, 649

[56] References Cited

U.S. PATENT DOCUMENTS

| 4,099,437 | 7/1978 | Stavrou et al. | 84/617 |
| 4,508,001 | 4/1985 | Suzuki | 84/604 |
| 4,682,317 | 7/1987 | Tomisawa | 369/59 |
| 4,777,857 | 10/1988 | Stewart | 84/645 |
| 4,942,551 | 7/1990 | Klappert et al. | 360/32 |
| 4,945,806 | 8/1990 | Merrill, Jr. | 84/645 |
| 4,953,039 | 8/1990 | Ploch | 360/32 |
| 4,992,886 | 2/1991 | Klappert | 358/342 |
| 4,996,679 | 2/1991 | Yoshio | 369/33 |

FOREIGN PATENT DOCUMENTS

62-146470 6/1987 Japan .

Primary Examiner—William M. Shoop, Jr.
Assistant Examiner—J. Donels
Attorney, Agent, or Firm—Lowe, Price, LeBlanc & Becker

[57] ABSTRACT

In a MIDI signal processor for use with a CD player, MIDI data is extracted from predetermined subcode frame of a digital output signal of the CD player. The extracted MIDI data is rearranged into a set of bytes. A predetermined start bit is added to a head of each of the MIDI data bytes. A predetermined stop bit is added to an end of each of the MIDI data bytes. The MIDI data bytes with the start and stop bits are outputted in a serial manner.

12 Claims, 6 Drawing Sheets

| FRAME | P S T U V W | | |
|---|---|---|---|
| 0 | MODE | ITEM | |
| 1 | 0 0 | $n_3 n_2 n_1 n_0$ | → $n_3-n_0$: NUMBER OF MIDI BYTES IN PACK |
| 2 | Q0 | | |
| 3 | Q1 | | |
| 4 | a0 | | |
| 5 | a0' | b0 | |
| 6 | b0' | c0 | |
| 7 | c0' | | |
| 8 | a1 | | |
| 9 | a1' | b1 | |
| 10 | b1' | c1 | |
| 11 | c1' | | |
| 12 | a2 | | |
| 13 | a2' | b2 | |
| 14 | b2' | c2 | |
| 15 | c2' | | |
| 16 | a3 | | |
| 17 | a3' | b3 | |
| 18 | b3' | c3 | |
| 19 | c3' | | |
| 20 | P0 | | |
| 21 | P1 | | |
| 22 | P2 | | |
| 23 | P3 | | |

1 PACK (frames 0–23), MIDI DATA (frames 4–19)

START BIT 0 ... 1 STOP BIT

FIG. 4

|  | START BIT | | | | | | | | | STOP BIT |
|---|---|---|---|---|---|---|---|---|---|---|
|  | 0 | 1 | 2 | 3 | 4 | 5 | 6 | 7 | 8 | 9 |
| MIDI BYTE 0: | 0 | a0 | | | | | a0' | | | 1 |
| MIDI BYTE 1: | 0 | b0 | | | | | b0' | | | 1 |
| MIDI BYTE 2: | 0 | c0 | | | c0' | | | | | 1 |
| MIDI BYTE 3: | 0 | a1 | | | | | a1' | | | 1 |
| MIDI BYTE 4: | 0 | b1 | | | | | b1' | | | 1 |
| MIDI BYTE 5: | 0 | c1 | | | c1' | | | | | 1 |
| MIDI BYTE 6: | 0 | a2 | | | | | a2' | | | 1 |
| MIDI BYTE 7: | 0 | b2 | | | | | b2' | | | 1 |
| MIDI BYTE 8: | 0 | c2 | | | c2' | | | | | 1 |
| MIDI BYTE 9: | 0 | a3 | | | | | a3' | | | 1 |
| MIDI BYTE 10: | 0 | b3 | | | | | b3' | | | 1 |
| MIDI BYTE 11: | 0 | c3 | | | c3' | | | | | 1 |

MIDI SIGNAL PROCESSOR

BACKGROUND OF THE INVENTION

1. Field of the Invention

This invention relates to an apparatus for processing a digital signal such as a digital signal in MIDI (Musical Instrument Digital Interface) format designed to control electronic musical instruments.

2. Description of the Prior Art

Conventional MIDI format for a digital signal is designed to control electronic musical instruments. In a known MIDI-based music control system, MIDI signals are transmitted between various electronic musical instruments and a keyboard so that the musical instruments can be driven and controlled by operating the single keyboard.

Japanese published unexamined patent application 62-146470 discloses a digital information recording and reproducing system. In the system of Japanese patent application 62-146470, 8-bit MIDI code words representative of control information such as an interval, a scale, and a length of sound is recorded on a magnetic tape by a tape recorder of the helical scan type. When the MIDI words are reproduced from the magnetic tape, a start bit and a stop bit are added to each of the reproduced MIDI words to compose a 10-bit MIDI signal designed to drive and control electronic musical instruments.

A compact disk (CD) is an excellent recording medium for storing a large quantity of digitized information. Since CD signal format and MIDI signal format are significantly different from each other, it is generally difficult to directly record MIDI words on a compact disk. For example, a MIDI word has 8 bits while a usable part of a CD subcode has 6 bits. In addition, the bit rate of the MIDI system is 31,250 bps (bit per second) while the bit rate of the CD system is 28,800.

A conventional MIDI system lacks the ability to cope with a sudden interruption of the transmission of a MIDI signal. Therefore, in such a case, some of electronic musical instruments of the MIDI system tend to continue the generation of sounds.

SUMMARY OF THE INVENTION

It is an object of this invention to provide a MIDI signal processor which enables the communication between a MIDI system and a CD system.

It is another object of this invention to provide a MIDI signal processor which can cope with a sudden interruption of the transmission of a MIDI signal.

According to the first aspect of this invention, a MIDI signal processor for use with a CD player comprises means for extracting MIDI data from predetermined subcode frames of a digital output signal of the CD player; and means for rearranging the extracted MIDI data into a set of bytes.

According to a second aspect of this invention, a MIDI signal processor for use with a CD player comprises means for extracting MIDI data from predetermined subcode frames of a digital output signal of the CD player; means for rearranging the extracted MIDI data into a set of bytes; means for outputting the MIDI data bytes; means for detecting an un-playback mode of operation of the CD player; and means for outputting a predetermined note off command in place of the MIDI data bytes when the un-playback mode of operation of the CD player is detected by the detecting means.

According to a third aspect of this invention, a MIDI signal processor for use with a CD player comprises means for extracting MIDI data from predetermined subcode frames of a digital output signal of the CD player; means for rearranging the extracted MIDI data into a set of bytes; means for outputting the MIDI data bytes; means for detecting an uncorrectable error in the extracted MIDI data; and means for outputting a predetermined note off command in place of the MIDI data bytes when the uncorrectable error in the extracted MIDI data is detected by the detecting means.

BRIEF DESCRIPTION OF THE DRAWINGS

Like and corresponding elements are denoted by the same reference characters throughout the drawings.

DESCRIPTION OF THE FIRST PREFERRED EMBODIMENT

Figure 1:
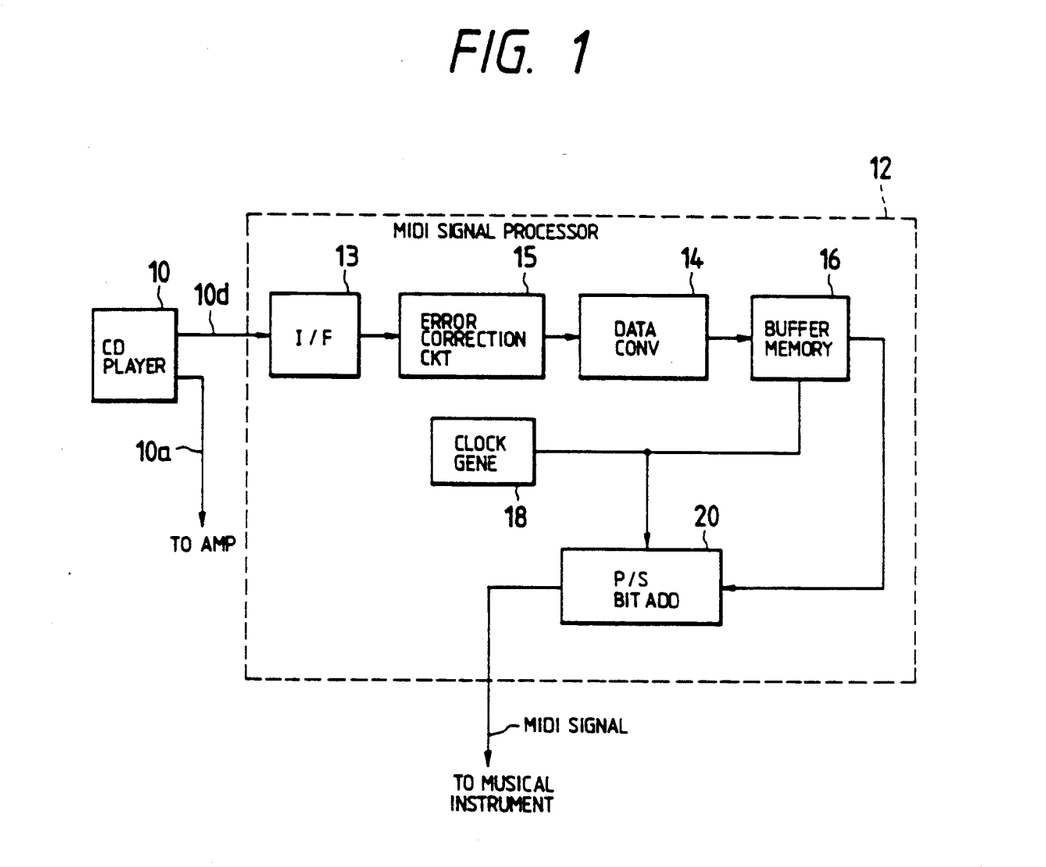
FIG. 1 is a block diagram of a MIDI signal processor according to a first embodiment of this invention.

With reference to FIG. 1, a CD player 10 outputs a digital signal 10d to a MIDI signal processor 12. The CD player 10 outputs and analog signal 10a to an amplifier (not shown). The MIDI signal processor 12 includes an interface 13, a data converter 14, an error correction circuit 15, a buffer memory 16, a clock signal generator 18, and a section 20 for parallel-to-serial conversion and bit addition.

Figures 2, 3:
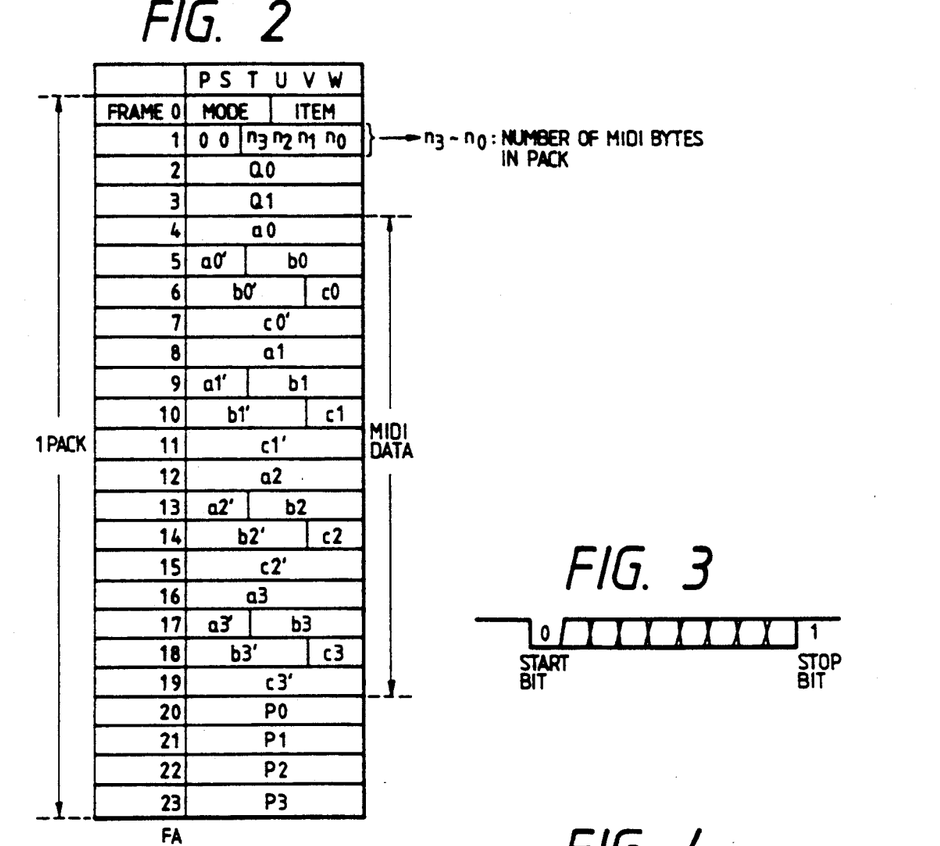
FIG. 2 is a diagram showing the format of a subcode data pack for a compact disk.
FIG. 3 is a diagram of the waveform of a one-byte MIDI signal which is being transmitted.

FIG. 2 shows stored conditions of data, the quantity of which corresponds to one pack of the CD subcode channel, that is, a set of the 0-th frame to the 23-rd frame. Each frame has 6 usable bits R, S, T, U, V, and W representing data. MIDI data are stored into the 4-th frame to 19-th frame. A unit of MIDI data is a byte, that is, 8 bits. The first MIDI data byte is divided into two parts a0 and a0' contained in the bits R-W of the 4-th frame and the bits R and S of the 5-th frame respectively. The second MIDI data byte is divided into two parts b0 and b0' contained in the bits T-W of the 5-th frame and the bits R-U of the 6-th frame respectively. In such a manner, successive 12 MIDI data bytes are each divided into two parts and are subsequently stored into the 4-th frame to 19-th frame.

FIG. 3 shows a waveform of one unit of a MIDI signal during transmission. One unit of the MIDI signal has a start bit "0", 8-bit MIDI data following the start bit, and a stop bit "1" following the MIDI data.

Figure 4:
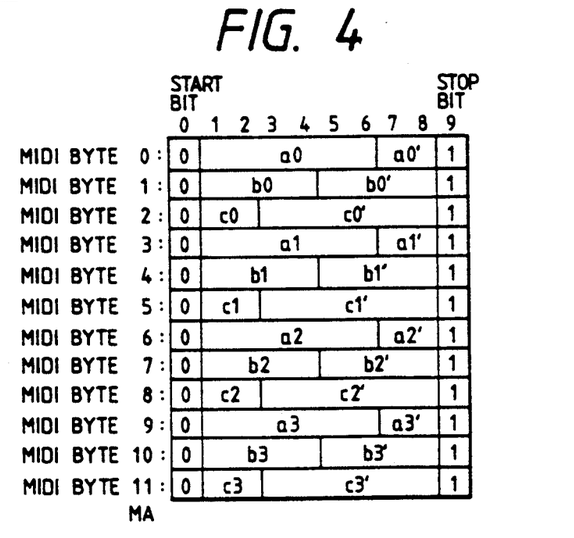
FIG. 4 is a diagram of the arrangement of MIDI data where the MIDI data are separated into a set of one-byte blocks each additionally provided with a start bit and a stop bit.

FIG. 4 shows the structure of one pack of a MIDI signal during transmission. The divided two parts a0 and a0' of the first MIDI data byte are combined again to restore the complete form of the first MIDI data byte. The start bit "0" and the stop bit "1" are added to the head and the end of the first MIDI data byte respectively. The divided two parts b0 and b0' of the second MIDI data byte are combined again to restore the complete form of the second MIDI data byte. The start bit "0" and the stop bit "1" are added to the head and the end of the second MIDI data byte respectively. In such a manner, 12 MIDI data bytes are restored in form and the start bit "0" and the stop bit "1" are added to each MIDI data byte.

According to MIDI standard, MIDI data are transmitted at a bit rate of 3,125 bytes per second. The CD player 10 outputs 300 packs per second in compliance with CD signal transmission format. Therefore, the CD player 10 has the ability to output 3,600 bytes of MIDI data per second. In order to meet the requirement for the bit rate of 3,125 bytes per second, only 3,125 bytes of MIDI data are previously stored into 300 packs of the CD subcode channel.

For example, 300 packs are separated into 25 groups each having 12 packs. In each group, 5 packs have 11 bytes of MIDI data each and 7 packs have 10 bytes of MIDI data each. Therefore, each group has 125 bytes of MIDI data, and 300 packs have 3,125 bytes of MIDI data.

In another example, 300 packs are separated into 25 groups each having 12 packs. In each group, some packs have 12 bytes of MIDI data each and the remaining packs have 11 or less bytes of MIDI data each while the sum of the numbers of bytes of the MIDI data are limited to 125. Therefore, each group has 125 bytes of MIDI data, and 300 packs have 3,125 bytes of MIDI data. This example is made in consideration of the following fact. Most of the MIDI data are 3-byte note on commands or 3-byte note off commands. Handling MIDI data in a block of 12 bytes is advantageous since 12 bytes is a multiple of 3 bytes related to such commands. In this way, the byte number of MIDI data being transmitted for each pack can be chosen arbitrarily in a range equal to or less than 12. The byte number is indicated in the second frame in each pack (see FIG. 2). In addition, in the case where the MIDI data has 11 bytes or less, the whole of the unused region of the 12-th byte is occupied by "0".

Figure 5:
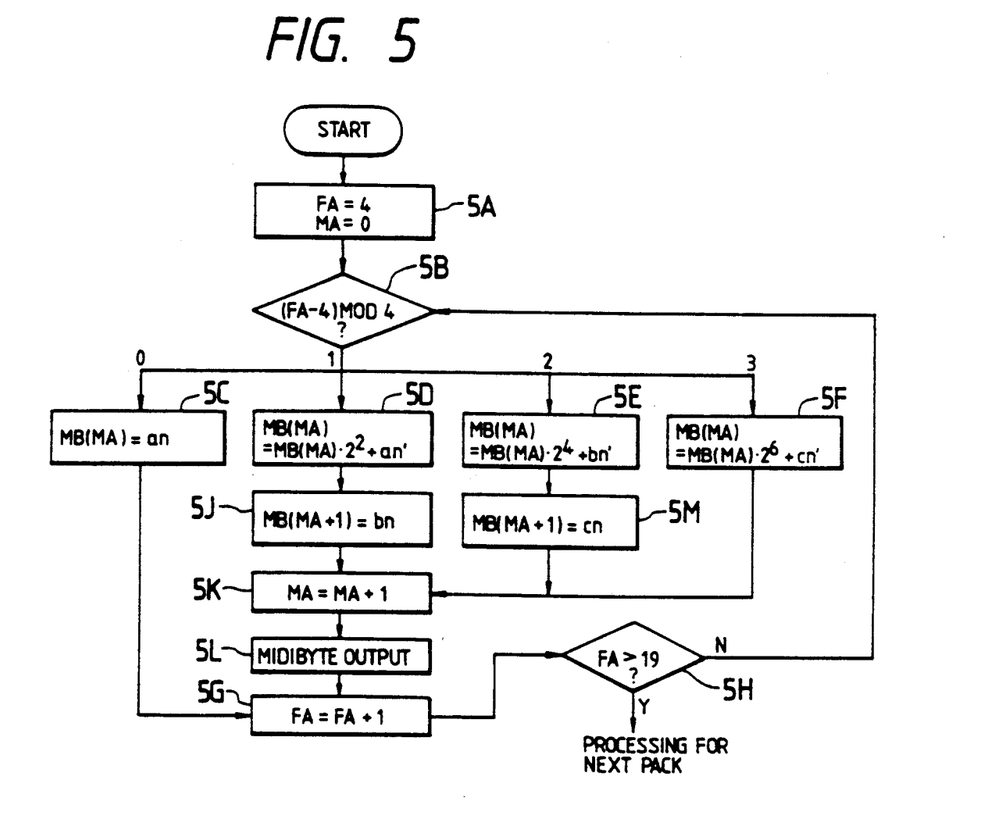
FIG. 5 is a flowchart of a program operating the data converter of FIG. 1.

The digital output signal 10d from the CD player 10 is transmitted to the data converter 14 via the interface 13 and the error correction circuit 15. The data converter 14 functions to extract 12 bytes of MIDI data from one pack of the CD subcode of the digital signal of FIG. 2 and rearrange the extracted 12 bytes of MIDI data into a format of FIG. 4. The data converter 14 is composed of a microcomputer operating in accordance with a previously-stored internal program. FIG. 5 is a flowchart of part of this program.

The program of FIG. 5 executes processing intended to rearrange MIDI data into a format of FIG. 4. As shown in FIG. 2, within the compact disk, MIDI data are sequentially stored into the user's bits R-W of predetermined frames. For example, the MSB of MIDI data a0 is stored into the user's bit R of the 4-th frame. The LSB of MIDI data a0 is stored into the user's bit S of the 5-th frame. As understood from FIG. 2, the arrangement of MIDI data in the CD frames have a certain recurrent pattern composed of 4 different configurations. According to this recurrent pattern, simpler processing of the MIDI data by use of the frame number can be enabled. This principle is used in the program of FIG. 5.

As shown in FIG. 5, a first step 5A of the program sets the variables FA and MA to 4 and 0 respectively. The variable FA represents the frame address number of a subcode which is shown in FIG. 2. Setting the frame address to 4 enables the later processing to start from the 4-th frame. This is because MIDI data are sequentially contained in 4-th and later frames. The variable MA represents the address number of a MIDI data byte which is shown in FIG. 4. After the step 5A program advances to a step 5B. The step 5B calculates the value "FA-4" which equals the frame address number FA minus 4. The step 5B divides the value "FA-4" by 4 and calculates the resultant remainder. When the remainder equals 0, the program advances to a step 5C. When the remainder equals 1, the program advances to a step 5D. When the remainder equals 2, the program advances to a step 5E. When the remainder equals 3, the program advances to a step 5F.

Figure 9:
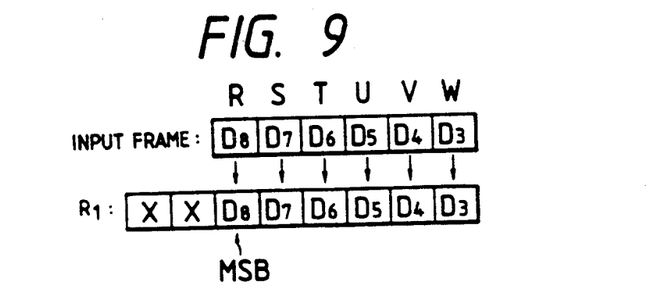
FIGS. 9 and 10 are diagrams of the temporary registers and the data in the data converter of FIG. 1.

In the case where the remainder equals 0, all the six bits of the input frame belong to the same MIDI data byte, and the first bit to the sixth bit of the MIDI data byte are sequentially arranged in the CD frame bits R-W respectively (see a0, a1, a2, and a3 in FIG. 2). Accordingly, the step 5C stores the input one-frame data into a one-byte temporary resistor R1 within the data converter 14 as shown in FIG. 9. Specifically, the step 5C executes the statement "MB(MA)=an" where the character MB(*) denotes MIDI data being held in the temporary register and the character n denotes the quotient of the division performed by the preceding step 5B. For example, in the case where the values FA and MA are equal to 4 and 0 respectively, the statement "MB(0)=a0" is executed. After the step 5C, the program advances to a step 5G which increments the frame number FA by 1. A step 5H following the step 5G compares the frame number FA with 19. When the frame number FA is not greater than 19, the program returns to the step 5B. When the frame number FA is greater than 19, the program advances to a stage for processing a next pack. It should be noted that MIDI data is contained only in the 19-th frame and the preceding frames.

Figure 10:
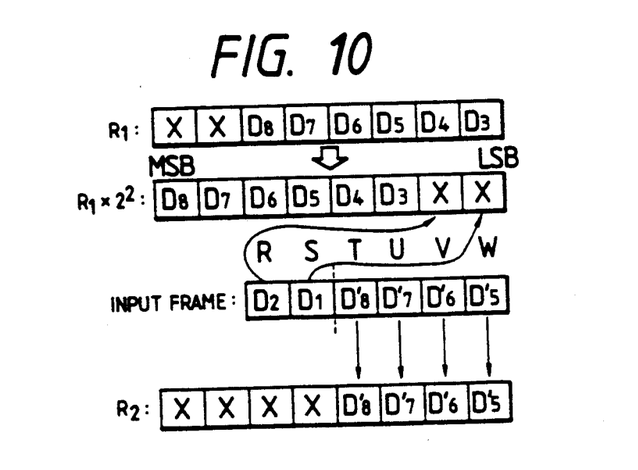

In the case where the remainder equals 1, the first and second bits of the input frame agree with the lowest and second lowest bits of the MIDI data byte (see a0', a1', a2', and a3' in FIG. 2), and the remaining bits of the frame agree with the first bit to the fourth bit of the next MIDI data byte (see b0, b1, b2 and b3 in FIG. 2). Accordingly, the step 5D adds the first and second bits of the input frame to the end of the data stored into the register R1 by the step 5C. Since the register R1 is loaded with data from the right-hand end, the previously-stored data in the register R1 is shifted leftward by two places and the first and second bits of the frame are stored into the lowest and second lowest places of the register R1 as shown in FIG. 10. The leftward shift of data by two places is performed by multiplying the data and "$2^2$". Specifically, the step 5D executes the statement "MB(MA)=MB(MA)·$2^2$+an'". For example, in the case where the values FA and MA are equal to 5 and 0 respectively, the statement "MB(0)=MB(0)·$2^2$+a0'" is executed. A step 5J following the step 5D stores the four remaining bits of the frame into another temporary resistor R2 within the data converter 14 as shown in FIG. 10. Specifically, the step 5J executes the statement "MB(MA+1)=bn". After the step 5J, the program advances to a step 5K which increments the byte number MA by 1. A step 5L following the step 5K transfers the MIDI data byte from the register R1 to the buffer memory 16. After the step 5L, the program advances to the step 5G.

In the case where the remainder equals 2, the first bit to the fourth bit of the input frame agree with the four lower bits of the MIDI data byte (see b0', b1', b2', and b3' in FIG. 2), and the fifth bit and the sixth bit of the frame agree with the highest bit and the second highest bit of the next MIDI data byte (see c0, c1, c2, and c3 in FIG. 2). Accordingly, the step 5E adds the four higher bits of the input frame to the end of the data stored into the register R2 by the step 5J. Since the register R2 is loaded with data from the right-hand end, the previously-stored data in the register R2 is shifted leftward by four places and the first bit to the fourth bits of the frame are stored into the four lower places of the register R2. The leftward shift of data by four places is performed by multiplying the data and "$2^4$". Specifically, the step 5E executes the statement "MB(MA)=MB-(MA)·$2^4$+bn'". A step 5M following the step 5E stores the remaining lowest the second lowest bits of the frame into the temporary resistor R1. Specifically, the step 5M executes the statement "MB(MA+1)=cn". After the step 5M, the program advances to the step 5K. The step 5L following the step 5K transfers the MIDI data byte from the register R2 to the buffer memory 16.

In the case where the remainder equals 3, all the six bits of the frame agree with the third bit to the eighth bit of the MIDI data byte (see c0', c1', c2', and c3' in FIG. 2). Accordingly, the step 5F adds the six bits of the input frame to the end of the data stored into the register R1 by the step 5M. Since the register R1 is loaded with data from the right-hand end, the previously-stored data in the register R1 is shifted leftward by six places and the six bits of the frame are stored into the lower six places of the register R1. The leftward shift of data by six places is performed by multiplying the data and "$2^6$". Specifically, the step 5F executes the statement "MB(MA)=MB(MA)·$2^6$+cn'". After the step 5F, the program advances to the step 5K. The step 5L following the step 5K transfers the MIDI data byte from the register R1 to the buffer memory 16.

The data converter 14 derives 12 bytes of MIDI data in this way and sequentially stores the MIDI data bytes into the buffer memory 16. The MIDI data are transferred from the buffer memory 16 to the section 20 in unit of one byte in synchronism with a clock signal generated by the clock signal generator 18. In the case where 12 bytes are processed for each of packs in this way, the unused region is included as explained previously. Accordingly, when the data is read out from the temporary register to the buffer memory 16, or when the data is transferred from the buffer memory 16 to the section 20, the portion corresponding to the unused region is skipped by referring to the byte number indicated in the second frame of each pack. Another way may be used in which the conditional equation in the step 5H of FIG. 5 is set as "MA>[indicated byte number—1]". In this case, the portion corresponding to the unused region is not included in the processing loop so that the previously-mentioned skipping process unnecessary. The section 20 converts one byte of MIDI data into a serial form and adds the start bit and the stop bit to the MIDI data byte to compose 10-bit MIDI serial data such as shown in FIG. 3. For example, the section 20 includes a 8-bit shift register and a known circuit for adding the start bit and the stop bit. The section 20 may be composed of a microcomputer. The serial MIDI data are outputted from the section 20 to an electronic musical instrument or instruments (not shown) in synchronism with the clock signal generated by the clock signal generator 18.

The subcode error correction circuit 15 functions to correct an error or errors in the subcode by use of parity check codes p0-p3 in the 20-th frame to the 23-rd frame and check codes Q0 and Q1 in the second to third frame. The structure of the subcode error correction circuit 15 may be the same as that of a typical subcode error correction circuit used in a conventional decoder for CD graphics. For example, the subcode error correction circuit 15 is composed of a microcomputer.

Since many portions of the MIDI signal processor 12 are similar to portions of a conventional CD graphics decoder, the MIDI signal processor 12 and the CD graphics decoder may be in common to each other. In this case, it is necessary to recognize whether the data in the CD subcode relates to graphics or MIDI. For this purpose, the three former bits of the 0-th frame in FIG. 2 are chosen as mode bits representing whether the data in the CD subcode of the present pack relates to graphics or MIDI. The mode bits are "001" when the data relates to graphics. The mode bits are "011" and the item bits are "000" when the data relates to MIDI. The three latter bits of the 0-th frame in FIG. 2 are chosen as item bits representing the type of the graphics.

In the case where the MIDI signal processor 12 and the CD graphics decoder are in common to each other, a step for checking the mode bits and judging whether or not the data relates to MIDI is added to a stage prior to the step 5A of FIG. 5. Only when the data relates to MIDI, the step 5A and the subsequent steps of FIG. 5 are executed.

The MIDI signal processor 12 may be built in the body of the CD player 10. In this case, the subcode data extracted from the reproduced CD digital signal can be directly fed to the error correction circuit 15 so that the interface 13 can be omitted.

DESCRIPTION OF THE SECOND PREFERRED EMBODIMENT

Figure 6:
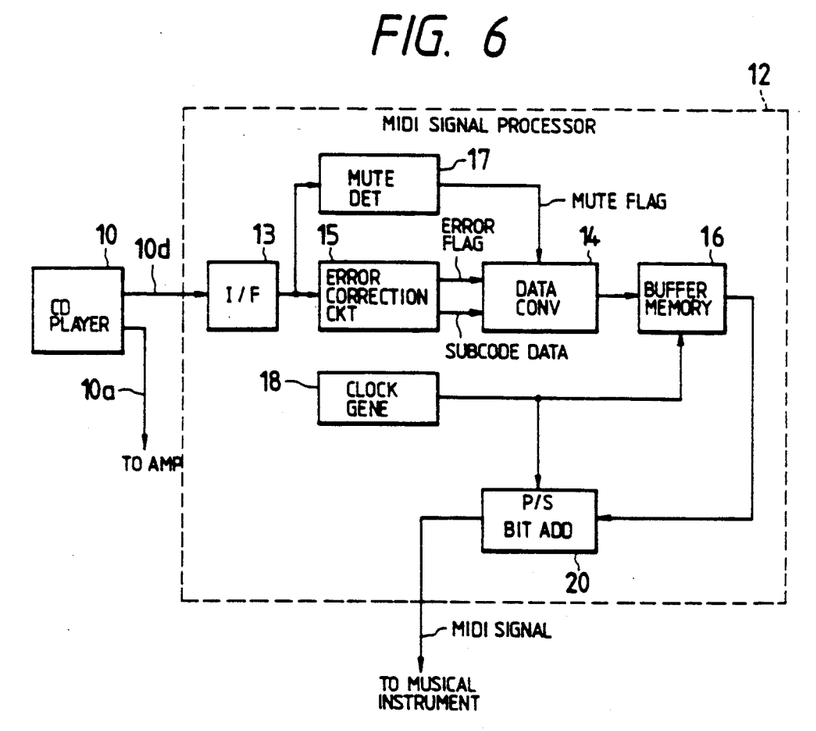
FIG. 6 is a block diagram of a MIDI signal processor according to a second embodiment of this invention.

FIG. 6 shows a second embodiment of this invention which is similar to the embodiment of FIGS. 1-5 except for designs indicated later. In the embodiment of FIG. 6, a MIDI signal processor 6 includes a mute detector 17 responding to the output signal from an interface 13. The mute detector 17 outputs a predetermined flag to a data converter 14 in the case where the digital output signal 10d from a CD player 10 is continuously absent for a predetermined time. This flag is referred to as the mute detection flag. A subcode error correction circuit 15 is designed so as to output a predetermined flag to a data converter 14 when an error which can not be corrected is present. This flag is referred to as the uncorrectable error flag.

Figure 7:
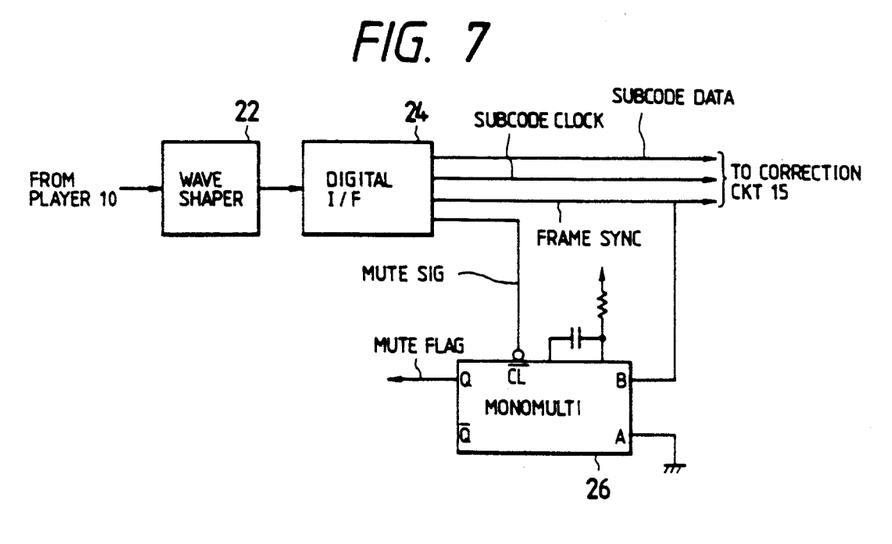
FIG. 7 is a block diagram of part of the interface circuit of FIG. 6.

As shown in FIG. 7, the interface 16 includes a wave shaper 22 and a digital interface 24. The waveform of the digital output signal 10d from the CD player 10 is shaped into a suitable rectangular waveform by the wave shaper 22. The output signal from the wave shaper 22 is fed to the digital interface 24. The digital interface 24 outputs the subcode data, the frame sync, and the subcode clock signal to the subcode error correction circuit 15. The digital interface 24 outputs the frame sync signal and the mute signal to a monostable multivibrator 26 composing the mute detector 17. For example, the digital interface 24 is composed of a commercially-available LSI such as named "YM3623B" produced by YAMAHA. Each pulse of the frame sync signal is outputted in correspondence with a frame. The frequency of the frame sync signal is 75×98 Hz. The mute signal assumes an H level when an error is detected in the digital interface 24. The frame sync signal is applied to the B input terminal of the monostable multivibrator 26. The mute signal is applied to the $\overline{CL}$ input terminal of the monostable multivibrator 26. The A input terminal of the monostable multivibrator 26 is grounded. The mute detection flag is transmitted from the Q output terminal of the monostable multivibrator 26 to the data converter 14.

During such modes of the operation of the CD player 10 as "stop", "pause", "skip", and "search" which differ from the normal playback mode, the bits R-W in the subcode are all "0". Therefore, when the operation of the CD player 10 changes from the normal playback mode to the non-playback mode such as "pause", the bits R-W in the subcode change to "0". This data is not recognized as an error in the digital interface 24, but this data causes the digital interface 24 to interrupt the outputting of the frame sync signal pulses.

The digital output signal 10d from the CD player 10 contains predetermined signals S0 and S1 for identifying one block of user's bits which can be used freely. The compact disk stores a digitized audio signal in unit of frame. Each frame has a frame sync signal and 264-bit information data including audio information, error correcting signals, and 8 user's bits. The 8 user's bits are usually labeled "P", "Q", "R", "S", "T", "U", "V", and "W". The former two bits P and Q are used by the CD player 10. The remaining 6 bits R-W can be used actually. According to CD standard, 98 frames are handled as one block. The signals S0 and S1 are indications for the boundaries between the blocks. The signal S0 is contained in the first frame of each block and the signal S1 is contained in the second frame of each block. The signals S0 and S1 are used as a block sync signal. According to CD standard, the signals S0 and S1 have predetermined bit patterns. The way of maintaining the block sync which is used by the digital interface 24 composed of the YAMAHA LSI "YM3623B" is omitting the frame sync pulse upon the receipt of each of the signals S0 and S1.

Figure 8:
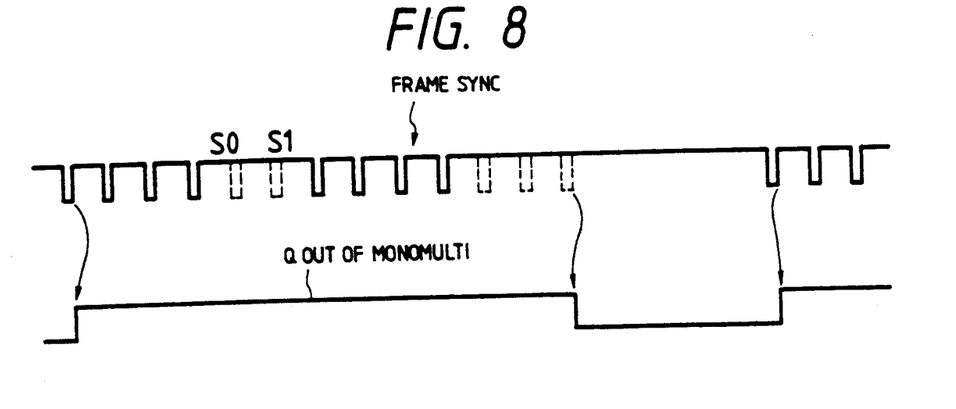
FIG. 8 is a timing diagram showing the relation between the frame sync signal and the Q output signal from the monostable multivibrator in FIG. 7.

FIG. 8 is a timing chart showing the relation between the frame sync signal and the Q output signal from the monostable multivibrator 26. The time constant of the monostable multivibrator 26 is set longer than the period where the frame sync pulses are continuously omitted in response to the signals S0 and S1. Therefore, during the normal playback mode of the operation of the CD player 10, the Q output signal from the monostable multivibrator 26 remains at the H level. In the case where the operation of the CD player 10 changes from the normal playback mode to the non-playback mode such as "pause", the Q output signal from the monostable multivibrator 26 changes to an L level since the frame sync pulse remains absent for a time longer than the time constant of the monostable multivibrator 26. The L-level Q output signal from the monostable multivibrator 26 is the mute detection flag.

During the normal playback mode of the operation of the CD player 10, an error of the output signal from the CD player 10 is detected in the digital interface 24, the digital interface 24 outputs the H-level mute signal to the $\overline{CL}$ input terminal of the monostable multivibrator 26 so that the monostable multivibrator 26 is reset. The Q output signal from the monostable multivibrator 26 changes to the L level in response to the resetting. The L-level Q output signal from the monostable multivibrator 26 is the mute detection flag.

When the data converter 14 receives the uncorrectable error flag or the mute detection flag, the data converter 14 generates a note off command independent of the processed MIDI data. The MIDI signal containing the note off command is transmitted from the data converter 14 to the buffer memory 16.

Figure 11:
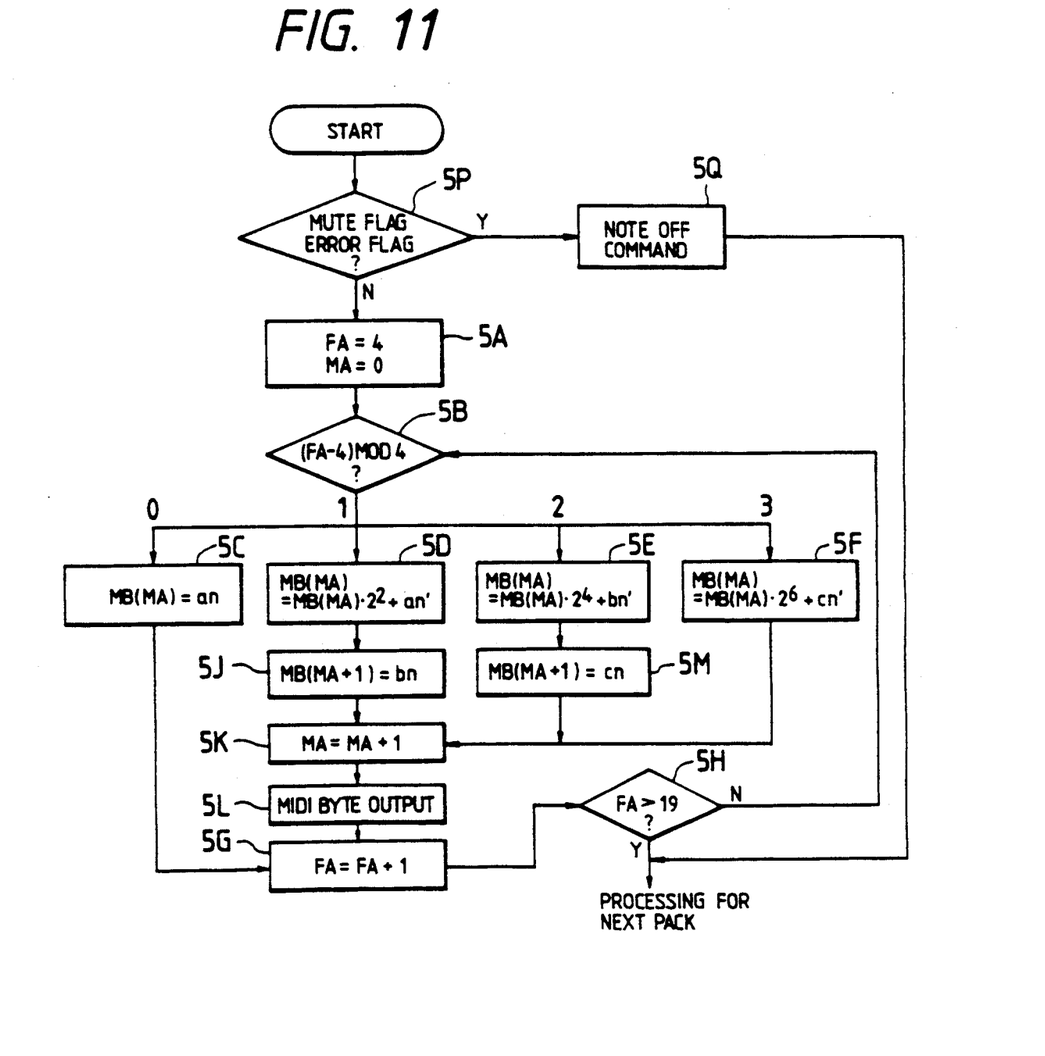
FIG. 11 is a flowchart of a program operating the data converter of FIG. 6.

FIG. 11 is a flowchart of part of a program operating the data converter 14. As shown in FIG. 11, a first step 5P of the program checks whether or not at least one of the uncorrectable error flag and the mute detection flag is present. When these flags are absent, the program advances to a step 5A. When at least one of the flags is present, the program advances to a step 5Q which outputs the note off command to the buffer memory 16. After the step 5Q, the program advances to a stage for processing a next pack.

It should be noted that the conditional equation explained in the first embodiment may be used in the step 5H.

One example of the note off command is an all note off command intended to suspend the generation of sounds from all the related electronic musical instruments. All the sounds of all the channels which are represented by "Bn 7B 00" (the letter n denotes the integer 0, 1, ... F indicating the channel numbers 1-16) are interrupted in response to the all note off command.

Another example of the note off command is a partial note off command intended to suspend the generation of selected sounds from selected electronic musical instruments, the selected sounds and the selected musical instruments being determined by the previously-outputted MIDI data. Specifically, a flag is used to denote the sound of the musical instrument which is given "the note on" by the previously-outputted MIDI data. This flag is set in a RAM map within the data converter 14. The partial note off command is directed only to the sound of the musical instrument denoted by the flag.

The following commands may be outputted together with the note off command.

En 40 00:pitch bend reset
Dn 00:channel pressure reset
Bn 01 00:modulation reset
Bn 02 00:breath controller reset
Bn 40 00:hold pedal reset
Bn 79 00:all controller reset
FC——:MIDI clock stop
F7——:system exclusive end
F0 7E 00 7E 00 F7:sample damp cancel The details of these commands are disclosed in published MIDI-related documents.

In the case where the MIDI signal processor 12 and the CD graphics decoder are in common to each other, the note off command is replaced by a command for clearing the reproduced image from a CRT display (not shown).

The detection of the non-playback mode of the operation of the CD player 10 may be performed by monitoring a predetermined output signal from a microcomputer within a controller of the CD player 10 which represents the non-playback mode of the operation. Specifically, a detector is provided which outputs a non-playback flag in response to the predetermined signal. The non-playback flag is used in place of the mute detection flag. In this case, the mute detector 17 can be omitted.

What is claimed is:

1. A MIDI signal processor for use with a CD player, comprising:
    means for extracting MIDI data from predetermined subcode frames of a digital output signal of the CD player;
    means for rearranging the extracted MIDI data into a set of bytes;
    means for outputting the MIDI data bytes;
    means for detecting an un-playback mode of operation of the CD player; and
    means for outputting a predetermined note off command in place of the MIDI data bytes when the un-playback mode of operation of the CD player is detected by the detecting means.

2. A MIDI signal processor for use with a CD player, comprising:
    means for extracting MIDI data from predetermined subcode frames of a digital output signal of the CD player;
    means for rearranging the extracted MIDI data into a set of bytes;
    means for outputting the MIDI data bytes;
    means for detecting an uncorrectable error in the extracted MIDI data; and
    means for outputting a predetermined note off command in place of the MIDI data bytes when the uncorrectable error in the extracted MIDI data is detected by the detecting means.

3. A MIDI signal processor for use with a CD player, comprising:
    means for extracting 6-bit-unit MIDI data from predetermined subcode frames of a digital output signal of the CD player;
    means for rearranging the extracted 6-bit-unit MIDI data into a set of 8 bit bytes;
    first adding means for adding a predetermined start bit to a head of each of the MIDI data bytes;
    second adding means for adding a predetermined stop bit to an end of each of the MIDI data bytes;
    wherein the first adding means and second adding means cooperate to convert the MIDI data bytes into 10-bit-unit MIDI data; and
    means for serially outputting the 10-bit-unit MIDI data.

4. A MIDI signal processor for use with a CD player, comprising:
    subcode error correcting means responsive to a digital output signal from the CD player for, in cases where there is an error in a subcode of a subcode channel in a given frame of packs reproduced from a CD, correcting the error and outputting a signal representative of a result of said correcting, and for, in cases where the error is uncorrectable, outputting a signal representative of an uncorrectable error flag;
    means for rearranging a MIDI signal into an 8-bit byte-unit signal, the MIDI signal being contained in a given area of subcodes outputted from the subcode error correcting means;
    means for adding a start bit and a stop bit to a beginning and an end of each of bytes of the 8-bit byte-unit signal respectively to convert the 8-bit byte-unit signal into a 10-bit-unit signal, and for serially outputting the 10-bit-unit signal as a MIDI output signal; and
    means responsive to the uncorrectable error flag signal outputted from the subcode error correcting means for outputting an all note off command as a MIDI output signal in response to the uncorrectable error flag signal.

5. A MIDI signal processor for use with a CD player, comprising:
    subcode error correcting means responsive to a digital output signal from the CD player for, in cases where there is an error in a subcode of a subcode channel in a given frame of packs reproduced from a CD, correcting the error and outputting a signal representative of a result of said correcting;
    mute detecting means responsive to the digital output signal from the CD player for outputting a signal representative of a mute detection flag in cases where the digital output signal from the CD player remains absent for a predetermined time period;
    means for rearranging a MIDI signal into an 8-bit byte-unit signal, the MIDI signal being contained in a given area of subcodes outputted from the subcode error correcting means;
    means for adding a start bit and a stop bit to a beginning and an end of each byte of the 8-bit byte-unit signal respectively to convert the 8-bit byte-unit signal into a 10-bit-unit signal, and for serially outputting the 10-bit-unit signal as a MIDI output signal; and
    means responsive to the mute detection flag signal outputted from the mute detecting means for outputting an all note off command as a MIDI output signal in response to the mute detection flag signal.

6. A MIDI signal processor for use with a CD player having a controller outputting a signal representative of the CD player being in an un-playback mode of operation, the processor comprising:
    subcode error correcting means responsive to a digital output signal from the CD player for, in cases where there is an error in a subcode of a subcode channel in a given frame of packs reproduced from a CD, correcting the error and outputting a signal representative of a result of said correcting;
    un-playback mode detecting means responsive to the output signal from the controller for outputting a signal representative of an un-playback mode flag when the CD player is in the un-playback mode of operation;
    means for rearranging a MIDI signal into an 8-bit byte-unit signal, the MIDI signal being contained in a given area of subcodes outputted from the subcode error correcting means;
    means for adding a start bit and a stop bit to a beginning and an end of each byte of the 8-bit byte-unit signal respectively to convert the 8-bit byte-unit signal into a 10-bit-unit signal, and for serially outputting the 10-bit-unit signal as a MIDI output signal; and
    means responsive to the un-playback mode flag signal outputted from the un-playback mode detecting means for outputting an all note off command as a MIDI output signal in response to the un-playback mode flag signal.

7. A MIDI signal processor for use with a CD player, comprising:

subcode error correcting means responsive to a digital output signal from the CD player for, in cases where there is an error in a subcode of a subcode channel in a given frame of packs reproduced from a CD, correcting the error and outputting a signal representative of a result of said correcting, and for, in cases where the error is uncorrectable, outputting a signal representative of an uncorrectable error flag;

means for rearranging a MIDI signal into an 8-bit byte-unit signal, the MIDI signal being contained in a given area of subcodes outputted from the subcode error correcting means;

means for adding a start bit and a stop bit to a head and an end of each of bytes of the 8-bit byte-unit signal respectively to convert the 8-bit byte-unit signal into a 10-bit-unit signal, and for serially outputting the 10-bit-unit signal as a MIDI output signal;

memory means responsive to the MIDI output signal for storing a note pitch and a type of at least one of a note source and an electronic musical instrument which are represented by the MIDI output signal; and means responsive to the uncorrectable error flag signal outputted from the subcode error correcting means for outputting a note off command in relation to a signal representing the note pitch and the type of at least one of the note source and the electronic musical instrument which are stored by the memory means in response to the uncorrectable error flag signal.

8. A MIDI signal processor for use with a CD player, comprising:

subcode error correcting means responsive to a digital output signal from the CD player for, in cases where there is an error in a subcode of a subcode channel in a given frame of packs reproduced from a CD, correcting the error and outputting a signal representative of a result of said correcting;

mute detecting means responsive to the digital output signal from the CD player for outputting a signal representative of a mute detection flag in cases where the digital output signal from the CD player remains absent for a predetermined time period;

means for rearranging a MIDI signal into an 8-bit byte-unit signal, the MIDI signal being contained in a given area of subcodes outputted from the subcode error correcting means;

means for adding a start bit and a stop bit to a beginning and an end of each of bytes of the 8-bit byte-unit signal respectively to convert the 8-bit byte-unit signal into a 10-bit-unit signal, and for serially outputting the 10-bit-unit signal as a MIDI output signal;

memory means responsive to the MIDI output signal for storing a note pitch and a type of at least one of a note source and an electronic musical instrument which are represented by the MIDI output signal; and means responsive to the mute detection flag signal outputted from the mute detecting means for outputting a note off command in relation to a signal representing the note pitch and the type of at least one of the note source and the electronic musical instrument which are stored by the memory means in response to the mute detection flag signal.

9. A MIDI signal processor for use with a CD player having a controller outputting a signal representative of the CD player being in an un-playback mode of operation, the processor comprising:

subcode error correcting means responsive to a digital output signal from the CD player for, in cases where there is an error in a subcode of a subcode channel in a given frame of packs reproduced from a CD, correcting the error and outputting a signal representative of a result of said correcting;

un-playback mode detecting means responsive to the output signal from the controller for outputting a signal representative of an un-playback mode flag when the CD player is in the un-playback mode of operation;

means for rarranging a MIDI signal into an 8-bit byte-unit signal, the MIDI signal being contained in a given area of subcodes outputted from the subcode error correcting means;

means for adding a start bit and a stop bit to a beginning and an end of each of bytes of the 8-bit byte-unit signal respectively to convert the 8-bit byte-unit signal into a 10-bit-unit signal, and for serially outputting the 10-bit-unit signal as a MIDI output signal;

memory means responsive to the MIDI output signal for storing a note pitch and a type of at least one of a note source and an electronic musical instrument which are represented by the MIDI output signal; and means responsive to the un-playback mode flag signal outputted from the un-playback mode detecting means for outputting a note off command in relation to a signal representing the note pitch and the type of at least one of the note source and the electronic musical instrument which are stored by the memory means in response to the un-playback mode flag signal.

10. A MIDI signal processor for use with a digital playback device, comprising:

means for receiving MIDI data stored in subcode packs from said digital playback device;

error detection means for detecting correctable and uncorrectable errors in said MIDI data and supplying an uncorrectable error flag signal in response to detecting an uncorrectable error in said data;

error correction means for correcting said MIDI data responsive to said error detecting means detecting a correctable error to supply corrected MIDI data;

signal formatting means for rearranging said corrected MIDI data into an 8-bit byte-unit signal;

protocol generator means for adding start and stop bits to each 8-bit byte of said 8-bit byte-unit signal converting the 8-bit byte-unit signal into a 10-bit-unit signal, and for supplying the 10-bit-unit signal as a serial MIDI output signal; and audio squelch means for supplying an all note off command as a MIDI output signal in response to the uncorrectable error flag signal.

11. The MIDI signal processor of claim 10, further comprising:

mute detecting means for detecting an absence of MIDI data from said digital playback device for a predetermined period wherein said audio squelch means supplies said all note off command as a MIDI output signal in response to a said mute detecting means.

12. The MIDI signal processor of claim 10, further comprising:
mode switching means for detecting a mode of operation of said digital playback device wherein said audio squelch means supplies said all note off command as a MIDI output signal in response to a said mode switching means.

* * * * *